Feb. 18, 1964     C. A. DAMM     3,121,583
CONNECTOR ALIGNING DEVICE
Filed Oct. 26, 1962                           2 Sheets-Sheet 2
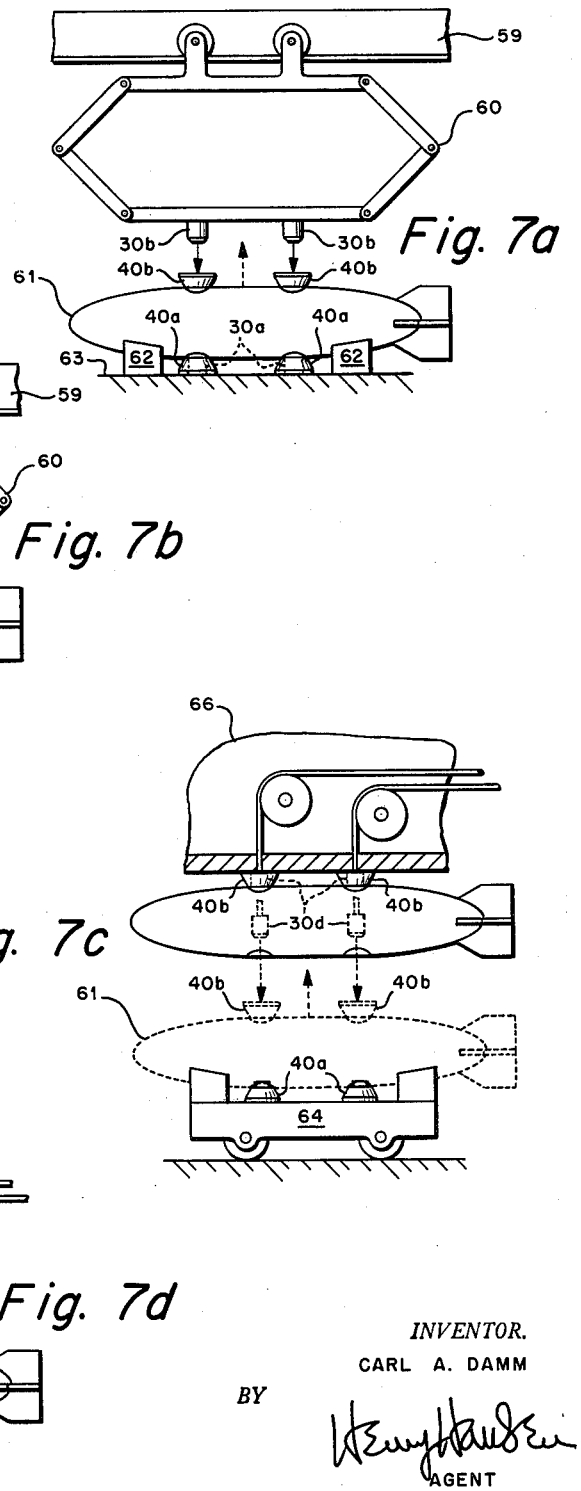
INVENTOR.
CARL A. DAMM
BY
AGENT United States Patent Office 3,121,583
Patented Feb. 18, 1964

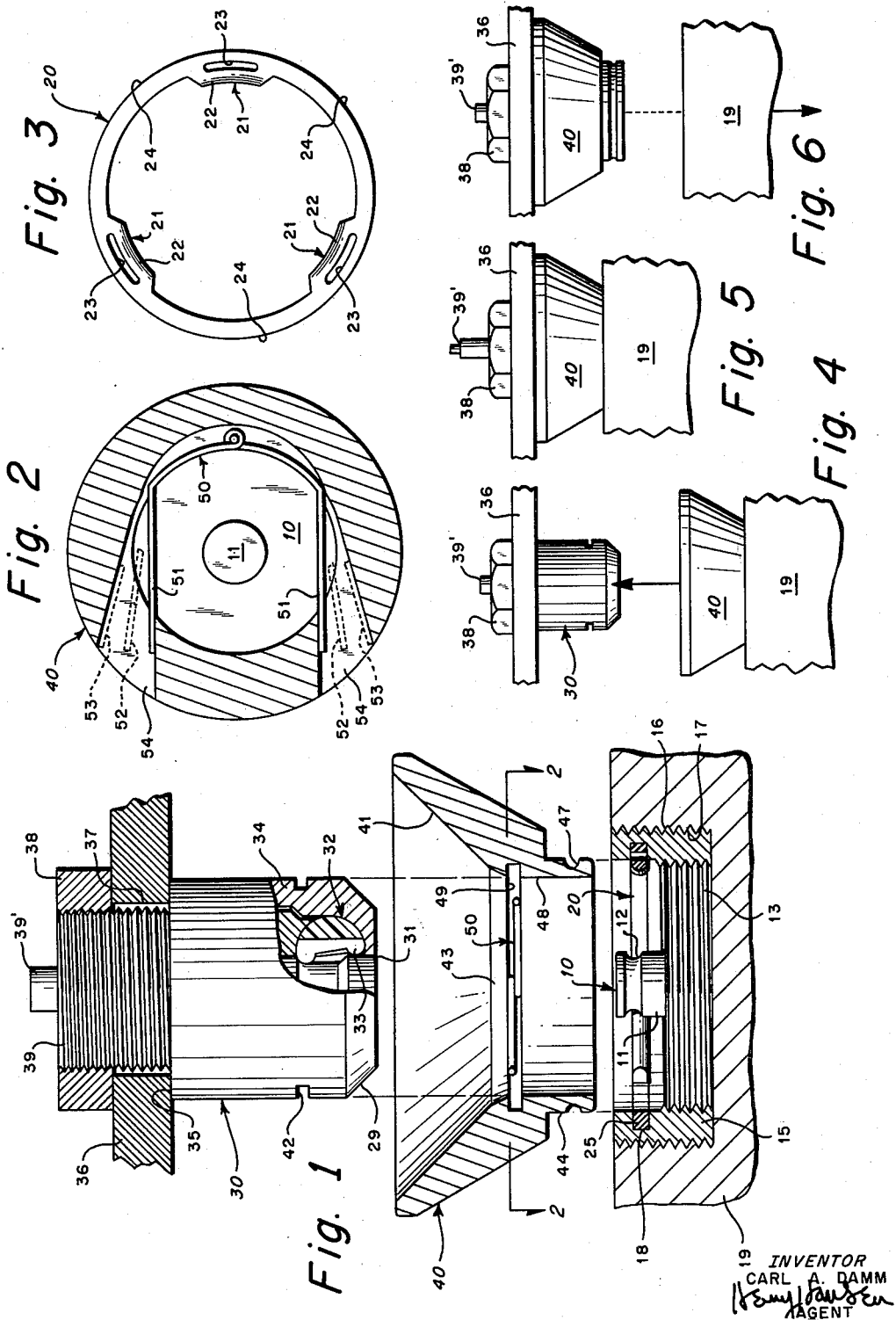

3,121,583
CONNECTOR ALIGNING DEVICE
Carl A. Damm, Upper Black Eddy, Pa., assignor to the United States of America as represented by the Secretary of the Navy
Filed Oct. 26, 1962, Ser. No. 233,490
9 Claims. (Cl. 294—83)
(Granted under Title 35, U.S. Code (1952), sec. 266)

The invention described herein may be manufactured and used by or for the Government of the United States of America for governmental purposes without the payment of any royalties thereon or therefor.

The present invention relates to a self-aligning device which permits the coupling of mating units under conditions of adverse angular misalignment and longitudinally or transverse offsets and more particularly to a self-aligning device which can be entirely removed from or left to remain with either the male or female portion of the mating units depending upon the requirements of the particular use.

In the weapon transfer designs now being used for the aircraft carrier rearming systems, the alignment and securing of the bomb hooks of suspension and release devices and the bomb lugs present many difficulties. Similar difficulties exist in present airlift systems wherein helicopters transfer suspended cargo via a sling from given land or sea-based installations. The configurations used in the present systems require manual supervision and control for alignment of the weapons or suspended unit and their carrier. Due to the structural or physical elements that envelope the mating units, visual observation of the mating units at their point of connection has been found to be limited. This condition of limited observation is further compounded by the relative motion of the aircraft due to aerodynamic forces and shipboard roll. Consequently, when one of the mating units is on the aircraft and the other one is referenced from the ship, a condition arises similar to that of trying to thread a moving needle. Also, the use of weapon loaders which elevate the weapon into the weapon suspension system creates additional disadvantages when used on an aircraft carrier. The ability to precisely control the hoisted unit to be aligned so that it coincides with the motion of the mating units is difficult since in addition to the independent motions of ship and aircraft a third element of motion is created: this is the motion of the weapon loader due to mechanical deflections, such as, bending, torsion, slack, play tolerances, override of mechanisms which actuate hoisting control components, and the inherent springing of the running gear of the weapon loader itself.

The above-mentioned disadvantages are further compounded when an attempt is made to engage the mating elements during blackout or night operations.

The bombs and torpedoes in present use are equipped with protruding lug appendages which are utilized to receive a hook for securing the weapon to its carrier but which also create interference flow conditions. By reason of this protruding lug and concomitant interference flow, accuracy in the delivery of the bomb or torpedo upon the target is impeded. In addition, the projecting element may be damaged if the weapon were roller over or dropped on a hard surface thereby precluding a hook portion from engaging the lug. In order to obviate these deleterious conditions, an attempt has been made to remove the lug and thereby provide a smoothly contoured bomb or torpedo.

When the external or projecting lugs were eliminated on some of the new aircraft torpedoes for the above-mentioned reasons, separate expandable bands were used in order to attach the torpedo to weapon suspension and release devices. These bands are jettisoned upon release and cost sixty dollars per unit torpedo installation and are used only once. Furthermore, since all torpedoes are not of the same diameter, separate band designs are required for the different torpedo diameters. Hence, the use of expandable bands created a problem in logistics, supply and storage.

Accordingly, it is an object of the present invention to provide a self-aligning device to permit the coupling of two mating units under conditions of adverse angular misalignment and longitudinal or transverse offsets wherein the self-aligning device can be selectably retained on either the male or female portion.

A further object of the invention is to provide a self-aligning device which requires no manual supervision and control for aligning the male and female portions of the mating unit.

Still another object of the invention is to provide a female portion having no portion thereof protruding beyond the exterior surface of the weapon when the same is screwed into the bomb or torpedo.

Various other objects and advantages will appear from the following description of an embodiment of the invention and the most novel features will be particularly pointed out hereinafter in connection with the appended claims.

In the drawing:
FIG. 1 illustrates a partial section view of the connecting elements of the invention in cooperative alignment;
FIG. 2 is a view taken along section 2—2 in FIG. 1;
FIG. 3 is a view of the locking detent ring of FIG. 1 in greater detail; and
FIGS. 4, 5 and 6 illustrate three orientations of the components of the invention.
FIGS. 7a, 7b, 7c and 7d illustrate schematically the stowage, handling, suspension and release system of the present invention.

Referring now to FIG. 1, it may be seen that the coupling and aligning device of the present invention generally comprises a lock-on stud assembly 10, a lock-on connector generally indicated by the reference number 30 and an aligning adapter 40.

The lock-on stud generally noted as 10 comprises a neck 11 having an annular groove 12 formed at the top thereof for receiving the lip portions 33 of the sprag assembly 32 which are elements of the lock-on connector 30. The operation of the lock-on connector 30 and especially the sprag assembly 32 is found in detail in Patent No. 3,043,614 patented July 10, 1962.

Neck 11 is formed with an externally threaded base portion 13 for engaging the internally threaded bore of receptacle 15. Receptacle 15 has external threads 16 constructed on the outside circumference thereof for engaging a tapped portion or cavity 17 in the bomb or store 19. The upper portion of the receptacle 15 is additionally constructed with a circumferential slot 18 in the inner circumference thereof for receiving the outer edge or rim 24 of an elastic friction ring 20. Friction ring 20 will be discussed in greater detail below with reference to FIG. 3.

It is within the contemplation of the invention that a locking pin could be provided to pass vertically through the base portion 13 and bomb 19 to preclude the rotation of the cylindrical base 13 within the receptacle 15.

The connector 30 is constructed with a shear cap 34 for engaging a shoulder 35 on a supporting structure 36. This supporting structure may comprise, for example, a storage rack, a dolly, or a bomb rack. Shear cap 34 is retained within an aperture 37 formed in supporting structure 36 by a thumb nut 38 threaded onto the hollow shaft 39.

The shear cap 34 is additionally constructed on the outer surface thereof with two locking slots or cordal segments 42 which are spaced 180° apart.

Continuing with the description of FIG. 1, an aligning adapter 40 is provided between stud 10 and connector 30 to guide the two mating components together to complete their union. The aligning adapter or guiding funnel 40 is provided with two conical surfaces within the funnel. The first conical surface 41 funnels the connector 30 toward and into the mouth of the mating unit or stud 10. The second and smaller conical surface 43 permits an angular misalignment of the mating units in any direction without any interference in the locking action of the unit. The lower portion of the adapter 40 is provided with a cylindrical base 44, the interior diameter thereof being equal to the diameter of the lock-on connector 30. The outer circumference of the base 44 is formed with a locking groove 47 for receiving the elastic friction ring 20 in order to frictionally retain the adapter 40 to the lock-on stud assembly 10 and receptacle 15. The interior surface 48 of cylindrical base 44 is provided in the upper section thereof with a circumferential channel 49 for receiving locking ring 50 which functions to positively engage the locking slot 42 on connector 30 to retain the adapter 40 on the connector 30. It should be noted that the lock-on connector 30 is chamfered at its lower end at 29 to facilitate the coupling operation.

Referring now to FIG. 2, locking ring 50 is shown in solid lines with its legs 51 in the at-rest position. Reference numeral 52 illustrates the legs of the locking ring 50 in dotted lines and in the position where they would engage the cordal segment 42 formed on the lock-on connector 30 for locking the adapter 40 to the connector 30. Reference numeral 53 illustrates the position of the leg of the locking ring 50 in dotted lines and immediately prior to its engagement in the locking slot 42. The legs of the locking ring are permitted to flex within the base 44 by reason of the slots 54 formed at one end thereof.

Describing the operation of joining the connector 30 to the aligning adapter 40, it is readily seen from FIGS. 1 and 2 that as the connector 30 is urged downwardly within the adapter base 44, the spring legs 51 will spread to position shown at 53 until the slot 42 aligns itself with the legs. At that time the spring will close and engage in the slot 42 as shown in the dotted line position 52. This engagement creates a positive connection and to disengage the connector 30 from the aligning adapter 40 it is necessary to rotate the adapter 40 90° in order to force the legs from position 52 to position 53. The lock-on connector can then be easily separated from the adapter 40. It is understood, of course, that the units may be prepositioned, that is, the adapter 40 may be rotated the 90° at one instant in time with the release taking place at another remote instant of time.

In contrast to the positive locking of the ring 50 in the slot 42, the cooperation of elastic ring 20 and locking groove 47 is a frictional lock. Referring now to FIG. 3, the elastic ring 20 is illustrated as having a plurality of inwardly facing radially spaced nodes 21. These nodes are additionally constructed with rounded leading edges 22 which engage the annular groove 47 on the exterior surface of the cylindrical base 44. Upon engagement with the base 44, the nodes 21 are compressed outwardly from the central axis of the ring by the camming action of the leading edge of the adapter base. When the annular locking groove 47 slides into position with the elastic friction ring 20, the nodes 21 spring back and enter the groove. The aforementioned compression is made possible by the formation of an oval relief hole 23 formed vertically through the ring section of each node which provides the space into which the elastomer can be compressed. This, in effect, permits the nodes to be retracted without disturbing the ring material between the nodes. The outer rim 24 of the ring 20 is continuous in order to retain the shape of the ring in its groove 18 thereby insuring that upon insertion of the adapter base 40 into the receptacle unit 15 no jamming action would occur due to the outward displacement of the material between the nodes caused by the inward compression of the nodes 21. The shape of the ring 20 between the nodes 21 is rectangular as shown by reference element 25 in FIG. 1 to prevent transverse rotation or twisting of the ring within the groove when the nodes are cammed during the engagement action of the adapter base 40. It is understood that the holding power of the ring can be varied by the elastic material used; amount and size of nodes; the shape of the nodes; and the overall volume of the node making contact within the groove.

Referring now to FIGS. 4, 5 and 6, FIG. 4 illustrates a bomb or store 19 in frictional locking engagement with the aligning adapter 40. The combination of the adapter 40 and store 19 are brought into coupling engagement with the lock-on connector 30 which, in turn, has been secured to supporting surface 36. The resulting connection, as shown in FIG. 5, causes the plunger 39' to be urged to its operative position. In this arrangement of FIG. 5, the aligning adapter is frictionally connected to the store 19 and is positively locked by the locking ring 50 engaging the lock-on connector 30. FIG. 6 illustrates that upon the actuation of the plunger 39' the load 19 will be released while the adapter 40 retains its positive lock on the connector 30. This occurs since the hammering action of the plunger and attendant structure is sufficient to break the frictional contact between the ring 20 and locking groove 47, thereby discharging the load, but is of no effect upon the positive coupling of connector 30 and adapter 40.

Referring now to FIGS. 7, 7a, 7b, and 7c, there is illustrated therein a unified stowage, handling, suspension and release system of the present invention.

Referring now to FIG. 7a, a bomb or store 61 is illustrated in its storage position being urged and held on bomb chocks 62 by the combination of connector 30a engaging the stud (not shown) on the bomb. The connector 30a is shown in dotted lines and is integrally associated with the storage base 63. A pair of aligning adapters 40a are frictionally coupled to bomb 61 at the bottom thereof but are in the uncoupled position with regards to connector 30a. That is, the locking slots 42 are not engaged by locking ring 50. A pair of aligning adapters 40b are positioned on the top of the bomb and as shown in FIG. 7a, is about to be engaged by connectors 30b attached to the pantograph or overhead system 60 running on rails 59. After actuation of the connecting member 30a on the storage base, the overhead system 60 with the connectors 30b are guided by the aligning adapters 40 into engagement with a stud (not shown) formed on the bomb 61. The overhead system then lifts the bomb and carries the same to a transfer dolly mechanism 64, as shown in FIG. 7b. The dolly mechanism 64 is provided with a pair of connectors 30c for engaging the lower pair of studs on the bomb. The bomb is guided to align the dolly connector 30c and lower studs on the bomb whereupon the upper connectors 30b on the panto-graph are actuated, whereupon the bomb and the upper and lower pair of adapters 40b and 40a are supported by dolly 64.

The bomb and dolly mechanism, with the upper and lower pair of aligning adapters still frictionally attached to the bomb, as shown by the dotted configuration of FIG. 7c, is then brought to the aircraft to be hoisted into engagement with the aircraft structure. The hoisting mechanism 66 is provided with connectors 30d, shown by the dotted lines in FIG. 7c. These connectors are aligned by adapters 40b to engage the studs provided on the bomb. At this time, the lower pair of adapters 40a are rotated to create a positive engagement with the dolly connectors 30c. After the connectors 30d are fastened to the stud on the bomb 61, the upper pair of adapters 40b are rotated to positively couple the same to the connectors 30d and the hoisting mechanism 66 is actuated. Since the connector 30c on the dolly mechanism has a positive lock with the lower pair of aligning adapters 40a and since the lower pair of aligning adapters have a frictional lock with the bomb 61, the hoisting operation will cause a separation at the frictional connection whereby the lower pair of aligning adapters 40a will be retained on the dolly mechanism 64. FIG. 7d illustrates that upon an actuation of a sufficient force to break the frictional contact between aligning adapter 40b and its bomb connection, the aligning adapter 40b will be retained by reason of the positive locking thereof with the pulley connector 30d. Therefore, the bomb 61 will be dropped or ejected without any protruding lugs or fastenings thereby obtaining increased accuracy in the bombing operation.

It will be understood that there are changes in the details, materials, steps and arrangement of parts which have been herein described and illustrated in order to explain the nature of the invention, which may be made by those skilled in the art within the principle and scope of the invention expressed in the appended claims.

What is claimed is:

1. A coupling and aligning apparatus comprising:
  a supporting structure,
  a connector member including a cap having a cylindrical bore therein terminating at one end in an aperture smaller than said bore,
  a fastening assembly received within said cap adjacent said aperture,
  attachment means on said connector member at the end remote from said aperture securing said connector to said supporting structure,
  a supported structure having a circular cavity on the outer surface thereof,
  a hollow cylindrical receptacle threadably engaging said cavity and also being internally threaded,
  a stud member including a circular base threadably engaging said interior threaded portion of said cylindrical receptacle,
  a neck portion integrally connected to and centrally located on said base member and extending outwardly of said supported structure,
  an annular groove formed in said neck portion at the end thereof remote from said base member being engageable by said fastening assembly,
  a circumferential channel formed in the interior surface of said cylindrical receptacle,
  an elastic friction ring operatively secured within said channel,
  said elastic friction ring being rectangular in cross section and including radially spaced inwardly extending nodes having the inwardly facing surface thereof of rounded configuration,
  oval relief holes formed in said nodes between said inwardly extending edge and the outer circumference of said elastic friction ring for receiving the material upon compression thereof,
  a pair of locking slots formed in said cap each being in a diametrically opposed position,
  an aligning adapter interposed between said connector member and said stud including a hollow cylindrical member,
  funnel means on one end of said cylindrical member for guiding said connector member into said hollow cylindrical member,
  means operatively associated with the interior surface of said hollow cylindrical member for positively engaging said locking slots on said connector to lock the same to said cylindrical member,
  and a second means formed on the exterior of said hollow cylindrical member for frictional locking engagement with said elastic ring whereby said adapter may be selectively retained on either or both of the coupling members.

2. A coupling and aligning apparatus comprising:
  a supporting structure,
  a connector member having an interior fastening assembly at one end thereof,
  attachment means on said connector at the other end for securing said connector to said supporting structure,
  a supported structure having a cavity on the outer surface thereof,
  stud means in said cavity engageable by said fastening assembly,
  friction ring means operatively secured within said cavity,
  locking slot means formed on said connector member,
  an aligning adapter interposed between said connector member and said stud means including a hollow cylindrical member,
  funnel means on one end of said cylindrical member for guiding said connector member into said hollow cylindrical member,
  positive locking means operatively associated with the interior surface of said hollow cylindrical member for engaging said locking slot means to lock said connector to said cylindrical member,
  and a second means formed on the exterior of said hollow cylindrical member for frictional locking engagement with said friction ring means whereby said adapter may be selectively retained on either or both of the coupling members.

3. A coupling and aligning apparatus comprising,
  a supporting structure,
  a connector member having an interior fastening assembly at one end thereof,
  attachment means on said connector at the other end securing said connector to said supporting structure,
  a supported structure having a cavity on the outer surface thereof,
  stud means in said cavity engageable by said fastening assembly,
  friction ring means operatively secured within said cavity,
  locking slot means formed on said connector member,
  an aligning adapter interposed between said connector member and said stud means including a hollow frustro-conical housing having a relatively large internal diameter at one end and a smaller internal diameter at the other end thereof,
  a hollow cylindrical base member having the interior diameter thereof substantially equal to said smaller diameter and integrally connected to said smaller diameter end of said housing,
  a circumferential channel formed in the interior surface of said cylindrical base member,
  locking ring means positioned within said channel for engaging said locking slot means to lock said connector to said housing,
  and circumferential locking groove means formed about the exterior surface of said cylindrical base member for engagement with said friction ring means whereby said aligning adapter may be selectively retained on either or both of the coupling members.

4. A coupling and aligning apparatus comprising,
a supporting structure,
a connector member having an interior fastening assembly at one end thereof,
attachment means on said connector at the other end securing said connector to said supporting structure,
a supported structure having a cavity on the outer surface thereof,
stud means in said cavity engageable by said fastening assembly,
friction ring means operatively secured within said cavity,
locking slot means formed on said connector member,
an aligning adapter interposed between said connector member and said stud means including a hollow frustro-conical housing having a relatively large internal diameter at one end and a smaller internal diameter at the other end thereof,
a hollow cylindrical base member having the interior diameter thereof substantially equal to said smaller diameter and integrally connected to said smaller diameter end of said housing,
a circumferential channel formed in the interior surface of said cylindrical base member,
a locking spring means positioned within said channel for positively engaging said locking slot means to lock said connector to said housing,
and a circumferential locking groove formed about the exterior surface of said cylindrical base member for frictional locking engagement with said friction ring means whereby said aligning and adapter may be selectively retained on either or both of the coupling members.

5. The combination of claim 4 wherein said positive locking means includes two parallel spring legs joined at one end thereof by a resilient connecting member,
said legs being separated a distance less than the diameter of the connector member when in the unstressed condition.

6. A coupling and aligning apparatus comprising:
a connector member including a cap having a cylindrical bore therein terminating at one end in an aperture smaller than said bore,
a fastening assembly received within said cap adjacent said aperture,
a hollow internally threaded cylindrical receptacle in substantially axial alignment with said connector member,
a stud member including a circular base threadably engaging said interior threaded portion of said cylindrical receptacle,
a neck portion integrally connected to and centrally located on said base member,
an annular groove formed in said neck portion at the end thereof remote from said base member being engageable by said fastening assembly,
a circumferential channel groove formed in the interior surface of said cylindrical receptacle,
an elastic friction ring operatively secured within said channel,
said elastic friction ring being rectangular in cross section and including radially spaced inwardly extending nodes having the inwardly facing surface thereof of rounded configuration,
oval relief holes formed in said nodes between said inwardly extending edge and the outer circumference of said elastic friction ring for receiving the material upon compression thereof,
a pair of locking slots formed in said cap each being in a diametrically opposed position,
an aligning adapter interposed between said connector member and said stud including a hollow cylindrical member,
funnel means on one end of said cylindrical member for guiding said connector member into said hollow cylindrical member, means operatively associated with the interior surface of said hollow cylindrical member for positively engaging said locking slots on said connector to lock the same to said cylindrical member,
and a second means formed on the exterior of said hollow cylindrical member for frictional locking engagement with said elastic friction ring whereby said adapter may be selectively retained on either or both of the coupling members.

7. A coupling and aligning apparatus comprising,
a connector member having an interior fastening assembly at one end thereof,
a hollow cylindrical receptacle in substantially axial alignment with said connector member,
stud means within said cylindrical receptacle engageable by said fastening assembly,
friction ring means operatively secured within said cylindrical receptacle,
locking slot means formed on said connector member,
an aligning adapter interposed between said connector member and said stud means including a hollow cylindrical member,
funnel means on one end of said cylindrical member for guiding said connector member into said hollow cylindrical member,
positive locking means operatively associated with the interior surface of said hollow cylindrical member for engaging said locking slot means to lock said connector to said cylindrical member,
and a second means formed on the exterior of said hollow cylindrical member for frictional locking engagement with said friction ring means whereby said adapter may be selectively retained on either or both of the coupling members.

8. A locking conduit for receiving a telescoping member having a locking groove comprising,
a circumferential rectangular channel formed in the interior surface of said conduit,
an elastic friction ring operatively secured within said channel,
said elastic friction ring being rectangular in cross section, having the outer diameter thereof substantially equal to the inner diameter of said circumferential channel and including radially spaced inwardly extending nodes having the inwardly facing surface thereof of rounded configuration,
oval relief holes formed in said nodes between said inwardly extending edge and the outer circumference of said elastic friction ring for receiving the elastic material upon compression thereof whereby said locking conduit and telescoping member will be locked upon engagement of said nodes and the locking groove.

9. A releasable coupling comprising:
a hollow frustro conical housing having a relatively large internal diameter at one end and a smaller internal diameter at the other end thereof,
a hollow cylindrical base member having the interior diameter thereof substantially equal to said smaller diameter and integrally connected to said smaller diameter end of said housing,
a circumferential channel formed in the interior surface of said cylindrical base member,
a locking spring means positioned within said channel, said spring means including two parallel spring legs joined at one end thereof by a resilient connecting member, said legs being separated a distance less than the interior diameter of said hollow cylindrical base member when in the unstressed condition,
a circumferential locking groove formed about the exterior surface of cylindrical base member, and a mating member having the outer diameter thereof substantially equal to the interior diameter of said base member and including a diametrically opposed pair of terminal notches formed on the exterior surface thereof for selective locking engagement with said spring means.

References Cited in the file of this patent

UNITED STATES PATENTS

| | | |
|---|---|---|
| 1,977,008 | Neher | Oct. 16, 1934 |
| 2,097,628 | Liebhardt | Nov. 2, 1937 |
| 2,790,566 | Carrasco | Apr. 30, 1957 |
| 2,838,820 | Hakanson | June 17, 1958 |
| 2,865,076 | Newton et al. | Dec. 23, 1958 |
| 2,889,746 | Glassman et al. | June 9, 1959 |
| 3,039,811 | Bradley et al. | June 19, 1962 |
| 3,066,671 | Mescher et al. | Dec. 4, 1962 |

FOREIGN PATENTS

| | | |
|---|---|---|
| 45,310 | Austria | Dec. 10, 1910 |